United States Patent

[11] 3,631,247

[72] Inventor Hugh M. Barton, Jr.
Bartlesville, Okla.
[21] Appl. No. 810,723
[22] Filed Mar. 26, 1969
[45] Patented Dec. 28, 1971
[73] Assignee Phillips Petroleum Company

[54] MOSSBAUER GAMMA RAY SPECTROMETER
9 Claims, 3 Drawing Figs.
[52] U.S. Cl. .................................................. 250/83.3 R,
250/43.5 D, 250/71.5 R, 250/84, 250/108 R
[51] Int. Cl. ...................................................... G01t 1/17,
G01t 1/36
[50] Field of Search .......................................... 250/71.5,
84, 83.3, 108, 43.5 D

[56] References Cited
UNITED STATES PATENTS
2,817,764 12/1957 Jacobs et al. .................. 250/43.5 D
3,146,624 9/1964 Talbot .......................... 250/84

OTHER REFERENCES
Debrunner et al., " Versitile High Pressure Mossbauer Apparatus"; Review of Scientific Instruments; Vol. 371 No. 10 Oct. 1966; pp. 1310- 1315

Primary Examiner—James W. Lawrence
Assistant Examiner—Morton J. Frome
Attorney—Young and Quigg ABSTRACT: A catalyst containing a nuclide which exhibits the Mossbauer effect is irradiated with gamma rays while scanning through resonance conditions, the gamma radiation transmitted through the catalyst is measured and reactants are contacted with the catalyst as the measurement proceeds. The spectrometer includes apparatus for passing a second gamma-ray beam through a second absorbing body of similar characteristics to the body to be analyzed, a signal being produced representative of the difference in intensity of the two beams of gamma radiation, as a function of velocity.

INVENTOR.
H. M. BARTON, JR.

BY Young & Quigg
ATTORNEYS 3,631,247

MOSSBAUER GAMMA RAY SPECTROMETER

BACKGROUND OF THE INVENTION

This invention relates to gamma-ray spectrometers and to a method of analyzing a catalyst. It has long been known that gamma rays can be absorbed by the nuclei of atoms or molecules and remitted, similarly to sound and light waves. This absorption is characterized by resonance phenomena but, for many years, no useful applications of this phenomenon were known because the recoil of the nuclei took away part of the gamma-ray energy and thus destroyed the resonant condition.

More recently, Mossbauer discovered that gamma rays could be emitted or absorbed without significant recoil of the emitting or absorbing nucleus by utilizing certain crystalline materials. Here, the recoil momentum is eventually discharged as part of the overall thermal vibration of the atoms in the crystal lattice. By now, materials exhibiting the Mossbauer effect are well known, and the phenomenon can be studied by passing radiation from a gamma-ray emitter through an absorber to a scintillating crystal detector and photomultiplier, or other suitable gamma-ray detector.

In order to scan through the resonant condition in such a system, it is necessary to effect relative movement between the source and absorber to use small Doppler shift changes in the frequency resulting from the motion. The speed of movement required is very small, of the order of a few hundred micrometers per second.

Among the materials exhibiting the Mossbauer effect are iron, tin, zinc, gold, mercury, cesium, platinum, the lanthanides and the actinides.

Practical applications of the Mossbauer effect have been discovered in measuring small movements, as of buildings, changes in temperature or pressure, and changes in relative speeds of rotation.

BRIEF STATEMENT OF THE INVENTION

I have discovered a practical application of the Mossbauer effect in the analysis of catalytic materials, and also a novel gamma-ray spectrometer compensating for instrumental drift and permitting gamma-ray spectra to be observed or recorded with higher sensitivity than has hitherto been possible.

Any catalyst or other substance containing a nuclide which exhibits the Mossbauer effect can be analyzed. A beam of gamma radiation is passed through the catalyst and the radiation transmitted therethrough is measured as a function of velocity while effecting relative movement between the radiation source and absorber at a slow rate.

While the measurement proceeds, reactants are passed in contact with the catalyst to effect a reaction and changes in behavior of the nuclides in the catalyst are measured as the reaction proceeds. Thus, the condition of the catalyst nucleus can be studied under actual operating conditions, and this is affected by the electronic environment of the nuclide.

The changes in the gamma-ray spectrum are, in many cases, quite small and the output is subject to errors due to instrumental drift.

To eliminate this problem, I have provided a novel gamma-ray spectrometer wherein the radiation is passed through a body of the same size and characteristics as the catalyst to be tested, but containing the same effective amount of the nuclide exhibiting the Mossbauer phenomenon. No reactants are passed through this second body. The radiation passing through this second body is detected and a signal produced which is representative of the difference between the two outputs. This substantially eliminates the problem of instrumental drift and permits the sensitivity of the analysis to be substantially increased, as will become apparent hereafter.

I may also provide a trimming device to vary the quantity of radiation in one the beams so as to balance the energy supplied to the two detectors through the absorbing body. This can be a wedge-shaped piece of nonresonant plastic positioned to be moved into or out of the path of one of the beams. Alternately, a flat, nonresonant absorber can be used, the angular position of which is varied to adjust the absorption of gamma-ray energy thereby.

While my novel spectrometer is particularly adapted for analyzing catalysts in the manner already described, it is also suitable for making various other types of analysis. The freedom from drift and increased sensitivity result from having similar absorbing bodies in the two gamma-ray beams, one of which contains the same or nearly the same effective amount of the nuclide exhibiting the Mossbauer effect. The apparatus can, thus, be used as described to analyze or monitor catalytic reactions, the effect of the reactant on the nuclide of interest being varied as the catalytic reaction takes place. Alternatively, gamma radiation passing through the first absorbing body containing the nuclide of interest can be compared with radiation passing through a second similar absorbing body which is devoid of the nuclide of interest of which contains a predetermined amount thereof.

The invention can be more fully understood from the following detailed description taken in conjunction with the accompanying drawings, in which.

DETAILED DESCRIPTION OF THE INVENTION

Figure 1:
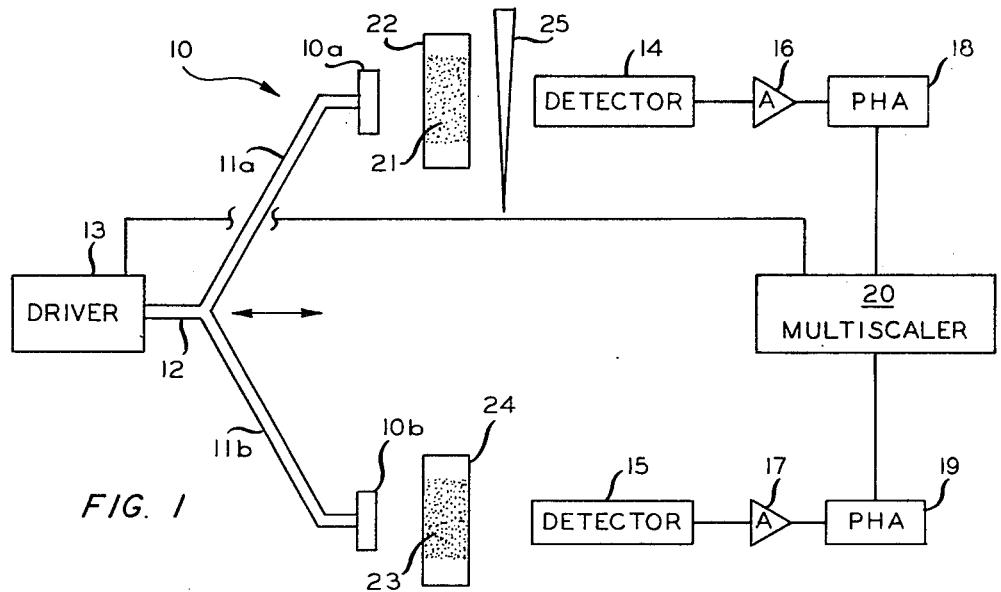
FIG. 1 is a schematic view of a gamma-ray spectrometer constructed in accordance with the invention.

Referring now to the drawings in detail and particularly to FIG. 1, the spectrometer includes a source 10 of gamma radiation. In the example shown, the source 10 comprises two discs 10a, 10b of the isotope cobalt-57, the discs being mounted at the extremities of rods 11a and 11b, respectively, which are integral with a rod 12. A driving mechanism 13 includes a variable velocity arrangement, not shown, arranged to move the rod 12 horizontally, FIG. 1, and thus effect relative movement between the source 10 and a pair 21, 23 of gamma absorbers, at a predetermined slow speed, suitable for scanning through resonance.

The detectors 14, 15 can each be of the well-known scintillating crystal type, the scintillations produced by the incident radiation being measured by a photomultiplier tube. The outputs of these tubes are fed, respectively, through amplifiers 16, 17, and pulse height analyzers 18, 19, to multiscaler 20 which produces an output representative of the difference between the signals generated by the pulse height analyzers 18 and 19. Thus, in a multiscaler, the pulses from one of the analyzers 18, 19 are fed to a subtract mode so that the signals from the analyzers are subtracted.

An absorbing body 21 to be tested is disposed between the disc 10a and the detector 14. This absorbing body may be contained within a cell 22 which is transparent to gamma radiation. The absorbing body 21 contains a nuclide exhibiting the Mossbauer effect, and it is thus interposed in the path of the gamma radiation passing from the disc 10a to the detector 14. In the example described employing a cobalt-57 source, the nuclide is iron.

A second absorbing body 23 contained in a cell 24 is interposed in the gamma-ray beam passing from the disc 10b to the detector 15. This absorbing body is similar to the absorbing body 21 except that the reactants are not passed through it.

In operation, gamma radiation beams pass from the discs 10a, 10b through the respective absorbing bodies 21, 23 to the detectors 14, 15. The mechanism 13 moves the rod 12 back and fourth, FIG. 1, at a slow variable speed, thereby scanning through resonance. The scintillations produced by the detectors are converted into electrical currents, amplified and subtracted in the multiscaler 20. As a result, changes in output due to drift are eliminated and the output accurately represents the effect of the reactants on the nuclide of interest in the sample 21.

The connection between the drive and multiscaler serves to advance the memory address location in the multiscaler as a function of velocity of the driver.

Any different in cell contents, sources or other geometrical consideration of the system are balanced out by inserting a nonresonant absorber 25 in the path of the beam passing from the disc 10a to the detector 14. In the example shown, the absorber or trimmer 25 is a wedge-shaped piece of plastic which can be moved into or out of the path of the beam to adjust the net count to zero at the beginning of the test. Alternatively, a flat nonresonant absorber can be used and its angular position varied to change the path length of the gamma radiation therethrough.

It will be apparent that I have achieved an object of the invention in providing a gamma-ray spectrometer which is free from drift and wherein unbalances in the system can be readily compensated for.

In illustrating another feature of the invention, the iron-containing absorbing body 21 functions as a catalyst in the production of hydrogen by the so-called steam-iron process. In this case, two similar bodies of catalyst constitute the absorbers 21 and 23. After initial balancing of the system, the feed stream is passed through the cell 22 which is maintained at the proper conditions of temperature and pressure to provide the catalytic reaction. Changes in the nuclei of the iron catalyst 21 can thus be observed as the reaction proceeds. Thus, the spectrometer can advantageously be utilized to test the catalyst or to monitor a commercial process utilizing the iron catalyst.

Figure 3:
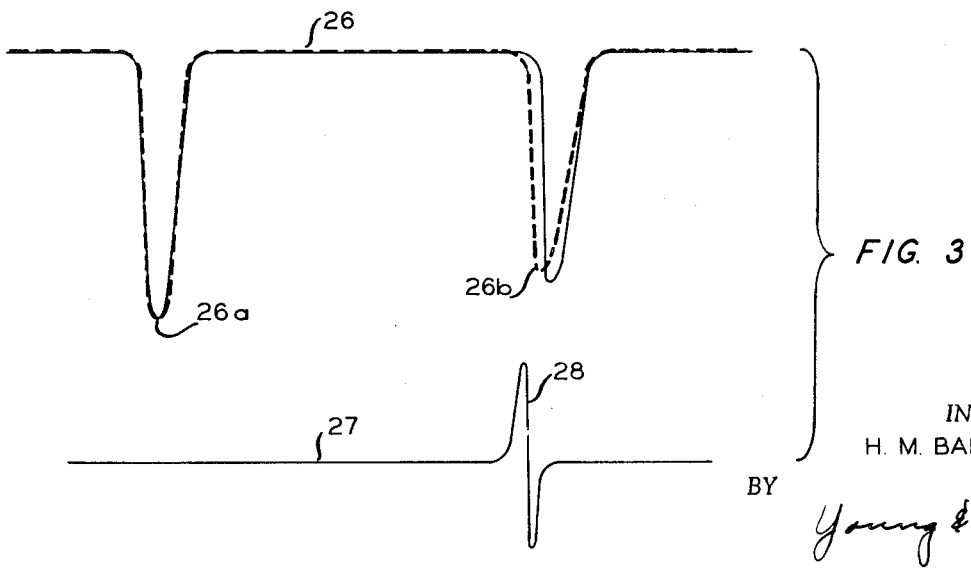
FIG. 3 is a graph illustrating the increased sensitivity obtained in analyzing catalysts.

In such analysis, FIG. 3 illustrates the increase in sensitivity obtained by the use of the two gamma-ray radiation beams. In the upper trace 26 the dotted line represents the velocity spectrum produced at the detector 14, where the gamma radiation has traversed the catalyst 21 in the cell 22 wherein the catalytic reaction is taking place. The full line represents the velocity spectrum produced by the similar body of catalyst in the cell 24 where no reactants are introduced.

Figure 2:
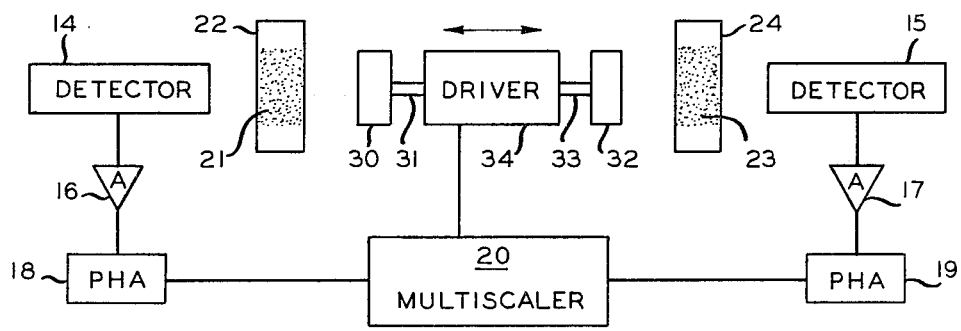
FIG. 2 is a schematic view of a modified form of spectrometer.

The connection between the driver and the multiscaler serves to advance the address location in the multiscaler memory and also in FIG. 2 to address the portions of the memory in proper fashion to take into account the fact that at a given instant of time the two detectors see radiation affected by different velocity directions although of the same velocity magnitudes.

The lower trace 27 represents the differential velocity spectrum produced by the multiscaler 20 representing the difference in the number of pulses produced by the pulse height analyzers 18 and 19 as a function of velocity. In the left-hand portion of FIG. 3, the two portions of the trace 26 may be coincident at 26a and no difference spectrum shows in the trace 27. The right-hand portion of FIG. 3 shows a signal 26b which may be produced after the catalytic reaction has proceeded, and the difference signal 28 is clearly delineated on the lower trace. It is evident that the lower trace produces a signal which can be much more readily detected and measured than would be possible by comparing the amplitudes of the two peaks 26a, 26b of the dotted line portion of the curve 26. Thus, the analyzer produces an output of considerably greater sensitivity and readability.

FIG. 2 illustrates a modified form of apparatus, the absorbing bodies, cells, detectors, amplifiers, pulse height analyzers and multiscaler being similar in construction and function to those described in FIG. 1 and being denoted by like reference characters. Connections to the multiscaler memory are more complicated here, and are not shown in detail.

In this embodiment, the source of gamma radiation comprises a disc 30 of gamma-emitting material carried by a rod 31 together with a disc 32 of similar material carried by a rod 33. The rods are moved toward or away from the cells 22, 24 in unison by suitable driving mechanism 34. This system is preferred for some applications because the source, absorbing bodies and detectors can all be kept in accurate axial alignment.

While the spectrometers illustrated in FIGS. 1 and 2 are particularly advantageous for testing catalytic materials, I have also provided a novel catalyst testing method which is not restricted to the particular spectrometer shown. Thus, insofar as I am aware, it is novel to include the step of passing reactants in contact with the catalyst while carrying out the test to permit the nuclear changes occurring during the resulting reaction to be followed differentially with great accuracy, and yields valuable information which has hitherto been unattainable. Alternatively, the source may be held fixed while the absorbers are moved, as is well known in the art.

Broadly speaking, this process of catalyst analysis can be applied to any catalytic material containing a nuclide exhibiting the Mossbauer effect. In addition to the use of iron-containing catalysts previously discussed, it is applicable, for example, to the testing of magnesium-phosphorus-tin catalysts utilized for the oxidative dehydrogenation of butenes to butadiene. In this case, the tin is the nuclide exhibiting the Mossbauer effect. Another example which may be mentioned is the testing of rubidium catalysts which are useful for a wide variety of hydrogenation and dehydrogenation reactions. Finally, the rare earths of atomic numbers 59 to 71 exhibit the Mossbauer effect (except promethium). These are utilized in dehydrogenation catalysts for butenes in connection with other constituents. These catalysts can also be advantageously tested by the method of this invention.

EXAMPLE I

A catalyst was prepared by calcining a mixture of $SnSO_4$ and $Mg(H_2PO_4)_2$ having a Mg/Sn mol ratio of 3/8 for 3 hours at 1,200° F. This catalyst was used in the oxidative dehydrogenation of butene-2 at a butene space velocity of 200 volumes per volume of catalyst per hour, an air space velocity of 1,000 v./v./hr., and a steam space velocity of 2,400 v./v./hr. An effluent sample taken after 15 minutes on stream at 1,000° F. was analyzed by gas chromatography, and it was found that butene conversion was 88 percent and butadiene yield was 81 weight-percent. Mossbauer analysis of the catalyst showed that all of the tin was in the +4 valence state as the reaction proceeded.

EXAMPLE II

A magnetic iron oxide ($Fe_3O_4$) catalyst was used in the production of hydrogen by the so-called "steam/iron" process, which is a two-step process involving the following reactions:

Step 1: 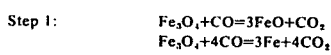

Step 2: 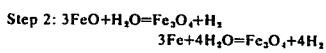

Step 1 was carried out at a carbon monoxide space velocity of 7,200 v./v./hr., 1,292° F., and atmospheric pressure. Step 2 was carried out at a steam space velocity of 15,000 v./v./hr., 1,292° F., and atmospheric pressure. Conversion of both carbon monoxide and steam was essentially 100 percent. Mossbauer analysis showed that the catalyst was 100 percent $Fe_3O_4$ before step 1 and after step 2. After step 1, the catalyst was 38 weight-percent FeO and 62 weight-percent Fe.

Other variations and modifications of this invention will be apparent to those skilled in the art without departing from the spirit and scope of the invention.

I claim:
1. A gamma-ray spectrometer comprising, in combination, a pair of gamma-ray detectors, a first absorbing body to be tested, said body containing a nuclide which exhibits the Mossbauer effect, a second absorbing body similar to said first absorbing body but containing the same or nearly the same effective amount of said nuclide, two gamma-ray sources, means for directing gamma radiation from said sources through the respective absorption bodies to said detectors, means for effecting relative movement between the sources and said absorbers and detectors at a rate to scan through resonance, and means producing a signal representative of the difference in output of said detectors, as a function of the velocity of said relative movement.

2. In the spectrometer of claim 1, a nonresonant gamma-ray absorber disposed in the path of said gamma radiation passing from the source through the first absorbing body, and means for moving said absorber to vary the flux of energy in the gamma-ray beam.

3. The spectrometer of claim 1 wherein the source comprise two discs of radioactive gamma-ray-emitting material, one disc being constructed and arranged to pass radiation through the first absorbing body and the second disc being constructed and arranged to pass gamma radiation through the second absorbing body.

4. The spectrometer of claim 3 wherein said discs are mounted upon spaced arms integrally formed with a rod, and including motor-driven mechanism to move said rod longitudinally with respect to the axis of the absorbing body and detectors, said mechanism constituting said means for effecting relative movement between the source and said absorbers and detectors.

5. The spectrometer of claim 3 wherein said discs, said absorbing bodies and said detectors are arranged in axial alignment, and including motor-driven mechanism to move said discs in a reciprocating motion in unison toward and away from the respective bodies, one disc being moved toward its respective body when the other disc moves away from its respective body, said mechanism constituting said means for effecting relative movement between the source and said absorbers and detectors.

6. A spectrometer as described in claim 1, in which the absorbers are held fixed with respect to the detectors, and a motor driver moves the sources.

7. The spectrometer of claim 1 wherein each of said absorbing bodies comprises a cell having a catalyst disposed therein, said catalyst being formed at least in part of said nuclide, and means to introduce into the cell of said first body reactants which undergo a reaction in the presence of said catalyst.

8. The spectrometer of claim 7 wherein said catalyst is $Fe_3O_4$ and said reactants are carbon monoxide and steam.

9. The spectrometer of claim 7 wherein said catalyst is a mixture of magnesium-phosphorus-tin and said reactants comprise butene-2.

* * * * *